United States Patent [19]

Speranza et al.

[11] Patent Number: 4,576,065

[45] Date of Patent: Mar. 18, 1986

[54] AUTOMATIC TRANSMISSION CONTROLS WITH MULTIPLE DOWNSHIFT OFF-HIGHWAY MODE

[75] Inventors: Donald Speranza, Canton; E. James Lane, Highland; Ronald K. Markyvech, Allen Park, all of Mich.

[73] Assignee: Eaton Corporation, Cleveland, Ohio

[21] Appl. No.: 649,630

[22] Filed: Sep. 12, 1984

[51] Int. Cl.$^4$ .................. B60K 41/18; B60K 41/10
[52] U.S. Cl. .................. 74/866; 74/752 D; 192/0.094; 192/0.09; 364/424.1
[58] Field of Search ............... 74/866, 752 A, 752 D; 364/424.1; 192/0.073, 0.09, 0.092, 0.094

[56] References Cited

U.S. PATENT DOCUMENTS

| | | | |
|---|---|---|---|
| 3,640,156 | 2/1972 | Mori et al. | 74/866 |
| 3,684,066 | 8/1972 | Kubo et al. | 74/866 X |
| 3,776,048 | 12/1973 | Enomoto et al. | 74/866 |
| 3,876,028 | 4/1975 | Asano et al. | 74/866 X |
| 3,942,393 | 3/1976 | Forster et al. | 74/866 |
| 3,974,720 | 8/1976 | Irjima | 74/866 |
| 4,038,889 | 8/1977 | Lindow et al. | 74/866 |
| 4,039,061 | 8/1977 | Pruvot et al. | 74/866 X |
| 4,208,929 | 6/1980 | Heino et al. | 74/731 |
| 4,226,295 | 10/1980 | Rembold et al. | 74/866 X |
| 4,338,666 | 7/1982 | Suzuki et al. | 364/424.1 |
| 4,361,060 | 11/1982 | Smyth | 74/866 |
| 4,517,646 | 5/1985 | Magannsson et al. | 364/424.1 |

FOREIGN PATENT DOCUMENTS

| | | | |
|---|---|---|---|
| 0109850 | 8/1980 | Japan | 74/866 |
| 0203256 | 11/1983 | Japan | 74/866 |
| 0040052 | 3/1984 | Japan | 364/424.1 |
| 1158800 | 7/1969 | United Kingdom . | |
| 1159582 | 7/1969 | United Kingdom . | |

Primary Examiner—George H. Krizmanich
Assistant Examiner—D. Wright
Attorney, Agent, or Firm—C. H. Grace; H. D. Gordon

[57] ABSTRACT

An improved control system for an automatic change gear transmission (10) driven by a throttle (18) controlled engine (12) is provided. The control system includes a processing unit (30) for receiving inputs indicating at least throttle position (18), engine speed (20) and vehicle speed (28) and for processing these inputs in accordance with a program to determine the correct engaged gear ratio and for issuing command signals to a transmission shifting mechanism (26). The processing unit includes of operator actuated selection means (32) for selecting a mode of operation ($D_1$ or $D_L$) wherein vehicle performance is maximized and the control will evaluate and execute allowable skip downshifts.

51 Claims, 3 Drawing Figures

| DRIVE RATIO | RATIO |
| --- | --- |
| 1 | 12.70 |
| 2 | 10.60 |
| 3 | 8.87 |
| 4 | 7.34 |
| 5 | 6.12 |
| 6 | 5.11 |
| 7 | 4.27 |
| 8 | 3.53 |
| 9 | 2.98 |
| 10 | 2.49 |
| 11 | 2.08 |
| 12 | 1.72 |
| 13 | 1.44 |
| 14 | 1.20 |
| 15 | 1.00 |
| 16 | .83 |
| LOW R | 11.69 |
| HIGH R | 8.15 |

Fig. 3

AUTOMATIC TRANSMISSION CONTROLS WITH MULTIPLE DOWNSHIFT OFF-HIGHWAY MODE

BACKGROUND OF THE INVENTION

1. Field of the Invention

This invention relates to automatic power transmissions providing a plurality of gear reduction ratios, such as automatic mechanical transmissions, and to control systems therefor. In particular, the present invention relates to control systems for vehicles with throttle controlled engines and automatic transmissions wherein gear selection and shift decisions are made and executed based upon measured and/or calculated parameters such as output shaft or vehicle speed, input shaft or engine speed, throttle position, calculated engine speed in a potentially engageable ratio, and the like. More particularly, the present invention relates to automatic transmission control systems of the type described above having a selectable mode of operation in which downshifting by more than a single ratio will be commanded if allowable.

2. Description of the Prior Art

The use of automatic transmissions of both the automatic mechanical type utilizing positive clutches and of the planetary gear type utilizing frictional clutches is well known in the prior art as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic transmission control systems for vehicles may be seen by reference to U.S. Pat. Nos. 4,361,060; 4,073,203; 4,253,348; 4,038,889; 4,226,295; 3,776,048; 4,208,929; 4,039,061; 3,974,720 and 3,942,393, all hereby incorporated by reference.

While the above referenced automatic transmission control systems, and similar systems, are effective to control an automatic transmission by selecting a desired gear ratio which will tend to optimize the fuel economy and/or performance of the vehicle in view of the sensed parameters and then to command a shift into the selected gear ratio, such control systems were not totally acceptable as the predetermined programs utilized to generate a shift pattern or patterns (also commonly referred to as a shift point profile) were not modifiable by the operator to select a mode of operation optimizing vehicle performance when ascending a steep grade (as would normally be encountered in off-road operating conditions). In particular, the relatively large inertia of a heavy vehicle ascending a relatively steep grade (for example, a grade of more than twenty percent (20%)) would tend to cause the vehicle to decelerate quickly and result in multiple rapid single downshifts which may be objectionable and cause further vehicle deceleration and/or stalling of the engine due to lack of power supplied to the vehicle from the engine during the out of gear portion of the shift transient.

SUMMARY OF THE INVENTION

In accordance with the present invention, the drawbacks of the prior art have been overcome or minimized by providing a control system, preferably an electronic control system, for automatic transmissions, such as automatic mechanical transmissions, wherein gear selection and shift decisions are made and executed based upon measured and/or calculated parameters including current input shaft or engine speed, throttle position, output shaft or vehicle speed and a calculated engine speed for the current vehicle speed and a prospectively engageable lower gear ratio and wherein the predetermined program by which shift commands are generated has an operator selectable mode wherein downshifts by more than one ratio (i.e. "skip downshifts") will be commanded if allowable.

The above is accomplished by providing a transmission control system including a central processing unit generating shift patterns based upon sensed or calculated engine speed and throttle position and, preferably, wherein the shift pattern at which upshifts are commanded is modified by raising the engine speed at which upshifts are commanded in response to the processing unit initiating a downshift. The control system is provided with operator selection means for selecting a mode of operation (usually for off-road operation) wherein the control will automatically evaluate, initiate and complete an allowable downshift through more than a single gear ratio to improve vehicle performance when ascending steep grades and the like. In this mode of operation, upon reaching an engine speed at which a downshift is indicated, the control will calculate the expected engine speed at current vehicle/output shaft speed in the Nth lower gear ratio (where N is a whole number greater than one (1), usually two (2) or three (3)) and command initiation of a downshift to the Nth lower ratio if the calculated expected engine speed does not exceed a maximum allowable value (preferably related to the speed at which engine damage might occur) and, preferably, prior to engagement of the Nth lower ratio again calculate the expected engine speed in the Nth lower ratio at the then current vehicle/output shaft speed and command engagement of the Nth lower gear ratio only if the calculated speed does not exceed the speed at which an upshift from the Nth lower gear ratio is commanded.

The control, in the selectable mode, will thus initiate a skip downshift if engine damage will not occur and, preferably, will not complete the skip downshift unless the vehicle is decelerating sufficiently to avoid an immediate upshift.

If a skip downshift is not allowable, a single downshift to the next lower ratio will be commanded.

Accordingly, it is an object of the present invention to provide a new and improved control system for automatic transmissions which will sense operator selection of a mode of operation wherein vehicle performance is to be maximized and which, in that mode, will command allowable skip downshifts.

This and other objects and advantages of the present invention will become apparent from a reading of the description of the preferred embodiment taken in connection with the attached drawings.

DESCRIPTION OF THE PREFERRED EMBODIMENT

Figure 1:
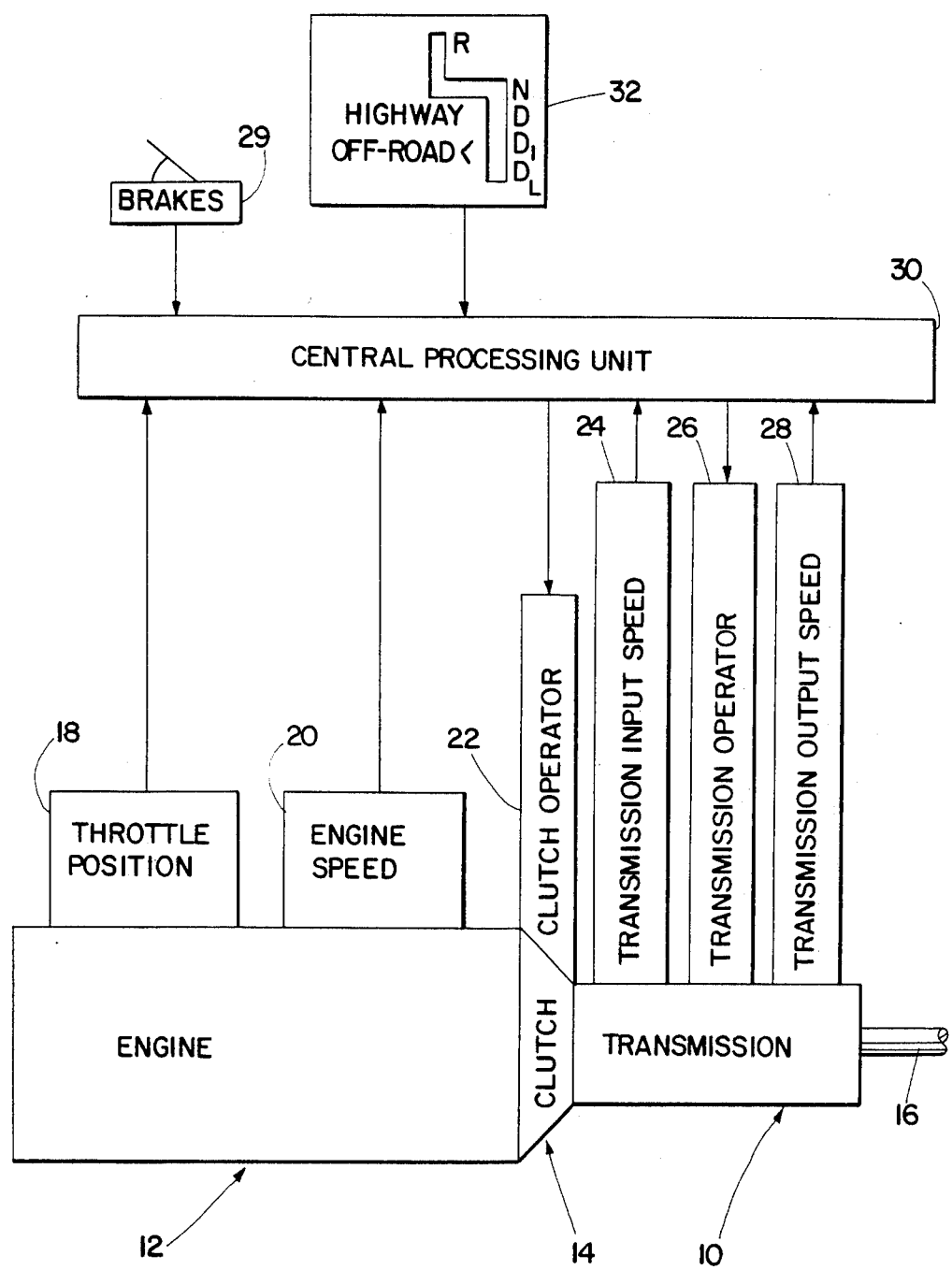
FIG. 1 is a schematic illustration of the components and interconnections of the automatic mechanical transmission control system of the present invention.

FIG. 1 schematically illustrates an automatic multispeed change gear transmission 10 driven by a throttle controlled engine 12, such as a well known diesel engine, through a friction master clutch 14. The output of the automatic transmission 10 is output shaft 16 which is adopted for driving connnection to an appropriate vehicle component such as the differential of a drive axle, a transfer case or the like as is well known in the prior art. The above mentioned power train components are acted upon and monitored by several devices each of which will be discussed in greater detail. These devices include a throttle position or throttle opening monitor assembly 18 which senses the position of the operator controlled vehicle throttle or other fuel throttling device, an engine speed sensor 20 which senses the rotational speed of the engine, a clutch operator 22 which engages and disengages clutch 14, a transmission input shaft speed sensor 24, a transmission operator 26 which is effective to shift the transmission 10 into a selected gear ratio, and a transmission output shaft speed sensor 28, and a brake application sensor 29.

The above mentioned devices supply information to and/or accept commands from a central processing unit 30. The central processing unit 30 may include analogue and/or digital electronic calculation and logic circuitry, the specific configuration and structure of which forms no part of the present invention. The central processing unit also receives information from a shift control assembly 32 by which the operator may select a reverse (R), neutral (N) or several forward drive (D, $D_1$, $D_L$) ) modes of operation of the vehicle. Alternatively to providing selectable $D_1$ and $D_L$ positions, a separate on-highway/off-road selector switch may be provided. An electrical power source (not shown) and/or source of pressurized fluid (not shown) provides electrical and/or pneumatic power to the various sensing, operating and/or processing units. Drive train components and controls therefor of the type described above are known in the prior art and may be appreciated in greater detail by reference to above mentioned U.S. Pat. Nos. 4,361,060; 3,776,048; 4,038,889; 4,226,295 and 4,361,060.

As is known, the central processing unit 30 receives direct inputs from sensor 18 indicating the present throttle position, from sensor 20 indicating the present engine speed, from sensor 24 indicating the present transmission input shaft speed, from sensor 28 indicating the present transmission output shaft speed, from sensor 29 indicating if the vehicle brakes are applied and from sensor 32 indicating the mode of operation selected by the vehicle operator or driver. In addition to these direct inputs, the central processing unit 30 may be provided with circuitry for differentiating the input signal from sensor 20 to provide a calculated signal indicative of the rate of acceleration of the engine, means to compare the input signals from sensor 24 and 28 to calculate a current engaged gear ratio, circuit means to compare the current engaged gear ratio with the signal from sensor 28 to provide a calculated engine speed means to sense full throttle, and means to calculate an expected engine speed in a given engaged ratio and at a given or sensed output shaft speed. The central processing unit also comprises a memory means for storing certain input and/or calculated information and means for clearing the memory means upon the occurrence of a predetermined event. Additionally, the central processing unit may include a timing device, such as a capacitor which decays at a known rate and which may be reset upon the occurrence of a predetermined event to measure a predetermined time interval. Specific circuitry for providing the above mentioned functions is known in the prior art and an example thereof may be seen by reference to above mentioned U.S. Pat. No. 4,361,060.

The memory means incorporated into the central processing unit 30 may store information such as the direction of the last shift, position of the throttle, rate of change of throttle position, vehicle speed or the like. The memory means may be reset upon the occurrence of a specified event such as engine or vehicle speed exceeding a predetermined limit, full application of the throttle, operator throttle setting exceeding or predetermined limit, the occurrence of a gear change, etc.

It is understood that, given a known drive train, output shaft speed and vehicle speed are related in a known manner. Also, assuming a fully engaged master clutch 14, input shaft speed and engine speed are equal and signals indicating any two of input shaft/engine speed, currently engaged gear ratio and output shaft/vehicle speed is sufficient to specify all three parameters.

Sensors 18, 20, 24, 28 and 29 may be of any known type or construction for generating analog or digital signals proportional to the parameter monitored thereby. Similarly, operators 22 and 26 may be of any known electrical, pneumatic or electro-pneumatic type for executing operations in response to command signals from processing unit 30. Sensor 18 may also be an operator to vary fuel supply to the engine to achieve synchronous shifting conditions.

A purpose of the central processing unit is to select, in accordance with a program and current or stored parameters, the optimal gear ratio at which the transmission should be operating and if necessary to command a gear change, or shift, into the selected optimal gear ratio based upon the current and/or stored information.

The ratio of the input shaft speed to the output shaft speed in the sixteen forward and two reverse drive ratios of a typical automated mechanical transmission 10 may be seen by reference to FIG. 3. It may be seen that the steps or splits between the forward ratios are approximately twenty percent (20%). For purposes of example, all forward steps or splits will be considered equal.

Clutch operator 22 is preferably controlled by the central processing unit 30 and may engage and disengage master clutch 14 as described in U.S. Pat. No. 4,081,065, hereby incorporated by reference. Transmission 10 may include synchronizing means, such as an accelerator and/or a brake mechanism as described in U.S. Pat. No. 3,478,851, hereby incorporated by reference. The transmission 10 is preferable, but not necessarily, of the twin countershaft type as is seen in U.S. Pat. No. 3,105,395, hereby incorporated by reference.

One of the principal functions of the automated mechanical transmission control system is is to make decisions as to the proper gear ratio that should be selected and engaged based upon driver demands and operation conditions. Ideally, an electronically controlled transmission can be programmed to enhance specific vehicle characteristics, fuel economy or performance; however, enhancement of one characteristic (i.e., fuel economy) often leads to a degredation of other characteristics (i.e., performance). Furthermore, there are constraints which must be considered which limit the degree to which specific characteristics can be enhanced. Such constraints include the ensurance of safe operation of the vehicle and the minimization of nuisance shifts which lead to increased driver fatigue. No absolute standards are known to exist for most of these constraints.

Selection of the D (on-highway drive) mode on the shift selector 32 by the driver indicates to the central processing unit 30 that peak performance is not required. In this mode, the gear selection subsystem may select fifth (5th) gear as the starting gear and select subsequent shifts, both upshifts and downshifts, according to what are referred to as the on-highway shift profiles which are intended to enhance fuel economy.

Similarly, selection of the $D_1$ (drive 1) or $D_L$ (drive low) modes of the shift selector by the driver indicates to the central processing unit 30 the desire to operate at peak performance at the expense of fuel economy. While in the $D_1$ mode, the gear selection subsystem may consider third gear (3rd) as the starting gear, and first (1st) gear is selected as the starting gear while in the $D_L$ mode. Subsequent shifts, both upshifts and downshifts, are selected according to what are referred to as the off-road shift profiles which are intended to enhance vehicle performance.

The reverse modes, R and $R_1$, are preferably implemented by explicit driver selection via the shift selector. Automatic shifting between R and $R_1$ is typically not required and not performed.

Figure 2:
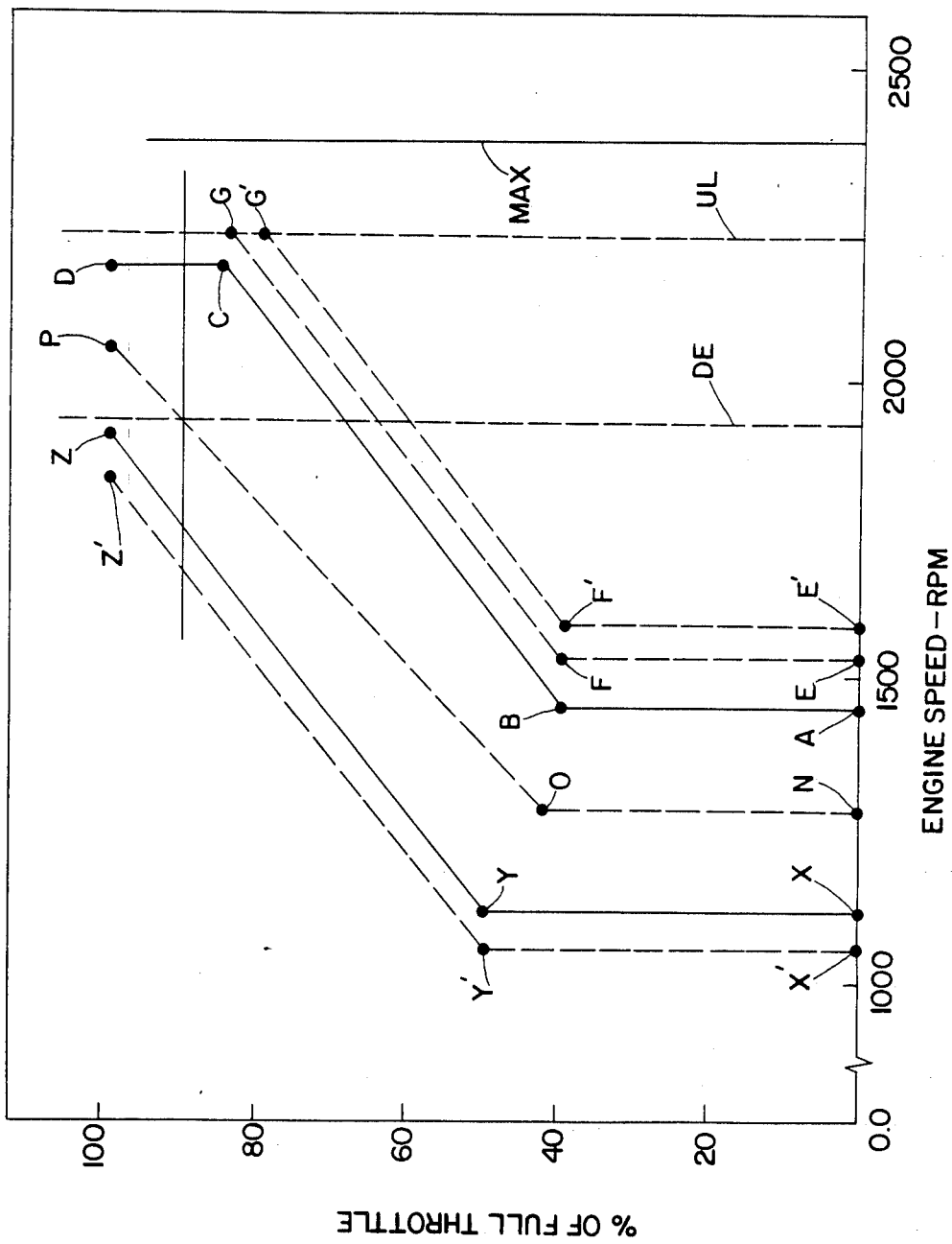
FIG. 2 is a graph of engine speed versus throttle position illustrating the shift patterns, or shift point profiles, generated by the control system of the present FIG. 3 table illustrating the ratio of input shaft speed to outshaft shaft speed of a typical automatic mechanical transmission in the various drive ratios thereof.

One of the primary purpose of the central processing unit program or logic rules is to generate shift patterns, or shift point profiles, as is seen in FIG. 2. The shift point profiles generated by the central processing unit will determine if the transmission should remain in the currently engaged gear ratio, should be upshifted to the next highest gear ratio or should be downshifted to the next lower gear ratio. The shift point profiles are determined by a predetermined program acting upon current or stored information and are usually selected to provide a compromise between operation at the most fuel efficient possible gear ratio and operation in a gear ratio to provide optimal performance characteristics of the vehicle. The shift point profiles graphically illustrated in FIG. 2 are a function of both throttle position, expressed as a percentage of maximum throttling position, and of engine speed. The engine speed may be directly sensed or, preferably, is calculated engine speed which will not vary during a shift transient as is known in the prior art.

As used herein, a "lower gear ratio" or "lower drive ratio" will refer to a gear or drive ratio having a higher ratio of input shaft speed to output shaft speed. For example, ninth (9th) gear is lower than tenth (10th) gear and a shift from tenth gear to ninth gear is a downshift.

Both the on-highway (A–B–C and X–Y–Z) and off-road (E–F–G and X'–Y'–Z') shift profiles provide the basis for shifting the transmission as a function of speed modulated by the driver controlled throttle postion. Both sets of profiles are primarily derived from the characteristics of the engine including the effects of all engine driven auxiliaries.

The engine speed signal, shown in FIG. 2 in terms of engine RPM, is derived by multiplying the transmission output shaft signal by the numeric value of the gear ratio of the gear currently selected by the control electronics. The selection information, and thus the multiplication factor, is preferably updated immediately for each new selection without reference to the actual mechanical status, thus allowing new shifts to be initiated, if required, during a shift in response to continuing changes in output shaft speed. Throttle position is shown as a percentage of full throttle from zero percent (0%); to one hundred percent (100%).

Referring to FIG. 2, the shift profile includes an on-highway upshift line A–B–C and an on-highway downshift line X–Y–Z. Briefly, for operating conditions within the space bounded by downshift line X–Y–Z and upshift line A–B–C no gear change is required, for operating conditions at or to the right of upshift line A–B–C an upshift to the next highest gear ratio is required and for operating conditions within the area at or to the left of downshift line X–Y–Z a downshift to the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each current engaged gear ratio.

It is understood that other sensed or calculated monitored speeds, such as input shaft speed, output shaft speed, vehicle speed or the like may be substituted for engine speed in the shift point profiles illustrated in FIG. 2.

As is known, for a specified internal combustion engine, such as a turbocharged diesel engine utilized in a heavy duty truck, for each throttle position there is an engine speed (usualy expressed in revolutions per minute or "RPM"), or range of engine speeds at which the engine is most fuel efficient. This optimal fuel efficiency operating condition is represented by the line N–O–P. The speed at which an engine is rotating is determined by the vehicle speed and engaged drive line gear ratio, only the transmission ratio of which is usually conveniently selectively variable, in set increments, in the drive line schematically illstrated in FIG. 1. Accordingly, for maximizing fuel efficiency, the transmission should be shifted as quickly and as often as possible to maintain the engine as close as possible to the maximum fuel efficiency line N–O–P. This can be accomplished by placing the upshift line A–B–C and the downshift line X–Y–Z as closely as possible, while maintaining at least a minimum hysterisis to prevent speed related hunting for proper gear ratio, to the maximum fuel efficiency line N–O–P.

Another concern in selecting desired gear ratio, that is when generating shift point profiles is vehicle performance. Vehicle performance may be defined as the ability to accelerate at at least a given rate and avoidance of unduly frequent up and down shifts, i.e. nuisance shifting. Generally, optimized vehicle performance requires that the upshift and downshift lines be spaced relatively distant from the optimum fuel efficiency line N–O–P.

It may be appreciated that the maximizing of fuel economy and maximizing of vehicle efficiency are often in conflict. The placement of upshift and downshift lines in a shift point profile is thus an attempt to achieve an optimal compromise between fuel efficiency and vehicle performance. As the relative importance of fuel efficiency and vehicle performance varies under different operating conditions, as determined by central processing unit 30 acting under current and/or stored information in accordance with a program, the upshift and downshift lines are preferably not static but are dynamic. Dynamically moving shift lines are known, and are discussed in greater detail in U.S. Pat. No. 4,362,060. Typically, the shift lines are moved in response to current and/or stored information such as direction of last shift, acceleration of the vehicle, acceleration of the engine, rate of change of throttle position, operation of the vehicle brake or the like.

It is important to understand that the shift point profiles are dependent upon the throttle position as well as the engine speed. Other than selecting a reverse, neutral or forward drive mode of operation of the vehicle by manipulation of selector 32, the operator's only input to the transmission is his manipulation of the throttle pedal or other fuel control as the case may be. Accordingly, by setting shift profiles and modifying same in partial response to throttle position the operator's desires are accounted for by the central processing unit when deciding the optimal gear ratio at which the transmission is to operate.

The term throttle as used herein means the device or mechanism by which the vehicle operator indicates the amount of fuel he desires to supply to the engine. Usually, the operator can select any amount of fuel varying from zero percent (closed throttle) to one-hundred percent (full open throttle) of maximum fuel supply. The actual device controlled may be a carburetor, a fuel injector and fuel injection rack or the like. Throttle position as used herein means the operator's selection of desired fuel supply to the engine expressed as a percentage of maximum fuel supply.

E-F-G is the upshift profile for the off-road shift profile while E'-F'-G' is the upshift profile as dynamically adjusted after initiation of a downshift as explained in greater detail in above-mentioned U.S. Pat. No. 4,361,060. X'-Y'-Z' is the off-road downshift profile.

The shift point profiles also include an upshift limit (UL) at which the transmission must be upshifted to prevent impending speed related damage to the engine and a downshift enable limit (DE) above which the transmission must not be downshifted to prevent speed related damage to the engine. The upshift limit (UL) and downshift enable limit (DE) are not functions of throttle position.

Upshifts occur if the operating point moves to the right of the A-B-C or UL profiles. Downshifts occur if the operating point moves to the left of the DE and X-Y-Z profiles. All of these profiles, shown in their normal position, are subject to movement in response to various signals. These movements and their rational will be described subsequently.

With a step change transmission, the ratio of engine speeds between any two gears is fixed by the ratio step or split (ratio of gear ratios). With profiles located as previously described, each upshift would lead to an operating point located on or near the downshift lines for the next high gear and vice versa. Hunting between gears would be inevitable. Some additional separation between the upshift and downshift profiles is desireable and acceptable; however, sufficient separation to eliminate hunting can result in an undesireable reduction in fuel economy. To overcome this problem, the control moves the shift profiles as a consequence of a shift. After an upshift, the downshift profile is moved towards lower engine speeds; after a downshift, the upshift profiles are moved towards higher engine speeds.

Preferably, as indicated above, the engine speed is a calculated rather than an actual engine speed, corresponding to the engine speed at drive train lock up conditions, which is determined by multiplying the output shaft speed by the appropriate gear ratio. The use of a calculated rather than an actual engine speed is preferred as actual engine speeds will vary during shift transients and the like.

While operation of the transmission in accordance with the above proceedure is satisfactory for on-highway conditions, in off-road conditions wherein a severe grade must be ascended by a heavily loaded vehicle, the vehicle performance in the on-highway mode of operation is often unsatisfactory. In cases of a steep grade, the inertia of vehicle may cause the vehicle to decelerate very rapidly, while the torque requirement to move and/or accelerate the vehicle may increase rapidly. Under such conditions, a shift logic which downshifts by a single step only may not provide acceptable operation as rapid repeated downshifts may be required which tend to be objectionable, the ratio of time in gear to time out of gear is lower than desired and the allowable ratio providing maximum torque may not be selected.

To overcome this drawback in at least the selectable off-road/performance modes of operation, the improved control system of the present invention operates on a program or proceedure by which a downshift of N (N equalling a whole number greater than one, preferably two or three) steps is evaluated and if allowable commanded.

In the $D_1$ or $D_L$ mode, upon sensing that the current engine speed, calculated or measured, is no more than the downshift engine speed for the current throttle position, i.e. is to the left of lines DE and X'-Y'-Z' in FIG. 2, the processing unit will automatically evaluate a downshift to the Nth lower gear ratio to determine if the expected engine speed in the Nth lower gear ratio at the same vehicle speed (usually determined by output shaft speed) is less than a predetermined maximum engine speed (a speed selected to prevent excessive rotational speed damage of the engine and/or related components). If the calculated expected engine speed exceeds the maximum allowable engine speed, a downshift to the next lower ratio from the current ratio is commanded or, if N is greater than two, the expected engine speed at the N minus 1 lower ratio may be calculated and compared to the maximum allowable engine speed. If the expected engine speed in the Nth lower gear ratio does not exceed the maximum allowable engine speed, the central processing unit 30 will command initiation of a downshift to the Nth lower gear ratio.

Preferably, prior to completion of the downshift to the Nth lower gear ratio, that is prior to actual engagement of the Nth lower gear ratio, the central processing unit will again evaluate the expected engine speed at the then current vehicle speed and command completion of the initiated skip downshift only if that calculated expected engine speed does not exceed the engine speed at which upshifts are commaned from the Nth lower ratio at current throttle position, i.e. if not to the right of UL or E'F'G' in FIG. 2. If the calculated expected engine speed does exceed the upshift speed, the control will command a downshift to the next lower ratio from the previously engaged ratio or, if N is greater than two, the control may command engagement of the N minus one ratio lower than the previously engaged ratio if an immediate upshift therefrom is not required.

For simplification, the following examples assume a transmission having the ratios set forth in FIG. 3 and that all ratio splits are equal allowing the use of common shift profiles for all currently engaged ratios. The value of N will vary with the number of selectable ratios and the split between ratios and may vary according to the currently engaged ratio if the splits are not equal.

Assuming N equals two (2), the $D_1$ (or $D_L$) mode of operation is selected, the transmission is currently engaged in tenth (10th) gear, the throttle is at ninety percent of full throttle and remains constant, and the maximum allowable engine speed is 2400 RPM. Upon sensing an engine speed of less than 1675 RPM, the control will calculate the expected engine speed in the second lower gear ratio (i.e. 8th gear) at a constant vehicle speed which will equal 2375 RPM (i.e. 1675 RPM times (3.53 divided by 2.49)). As the calculated engine speed in eighth gear is less than the maximum allowable engine speed, initiation of a downshift to eighth gear will be commanded. Preferably, to avoid a double or skip downshift followed by a rapid upshift, the control unit will again compute the expected engine speed in eighth gear, the Nth lower gear from the previously engaged gear (i.e. the second lower gear from 10th gear), prior to engaging eighth gear. If the vehicle has maintained a constant speed, the expected engine speed, in eighth gear, 2375 RPM will exceed the upshift engine speed (2225 RPM) from eighth gear and the control will command engagement of a single downshift to the next lowest ratio from the previously engaged ratio (i.e. to ninth gear from tenth gear). However, if the vehicle has decelerated to no more than approximately 92.7% of original vehicle speed at time of initiation of downshift, the expected engine speed will be less than the upshift engine engine speed from eighth gear and engagement of eighth gear will be commanded.

In another example, if the value of N equals three (3) and all other assumptions remain constant, the control would first evaluate expected engine speed in the third lower gear from the currently engaged gear, i.e. in seventh gear. In seventh gear, the expected engine speed equals 2875 RPM (1675 RPM×(4.27/2.49) which exceeds the maximum allowable engine speed, 2400 RPM. The control will then command a shift to the next lower gear from the current engaged ratio (i.e. into 9th and 10th gear) or, preferably, will evaluate a shift into the (N−1)th, i.e. into the second lower gear from the currently engaged gear ratio, eighth gear, and proceed as set forth above.

It is recognized that skip type downshifts are primarily desireable in the situation wherein vehicle speed is desired to be maintained and/or increased, or at least vehicle deceleration minimized. While skip type downshifts may also be desireable to avoid nuisance shifting while decelerating with engine compression braking, the amount of engine compression braking in a skip type downshift is somewhat decreased as compared with a progression of single downshifts.

In view of the above, the control may require that throttle position exceed a predetermined value (i.e. greater than sixty percent (60%)) and/or that the vehicle brakes not be applied as indications of operator desire for performance enhancing skip downshifts prior to initiation of the skip downshift proceedure discussed above.

For a multi-ratio transmission, such as transmission 10, at any given set of operating conditions there are usually several ratios which are permissibly engageable (i.e. will not cause overspeeding of the engine, will not cause stalling of the engine and will allow the vehicle to pull the load). As the number of ratios is increased, assuming substantially equal steps, the number of permissible ratios for a given set of operating conditions will also increase. By way of example, at 35 MPH, the sixteen speed transmission 10 is usually permissibly engaged in the third, fourth, fifth and/or sixth forward speed.

In typical prior art automatic mechanical transmission shift profiles, and in the on-highway (D) mode of the present invention, the upshift and downshift shift points lines for a given throttle position are selected to improve or maximize fuel economy and are often separated by a difference in engine speed less than two splits or steps. Maximizing fuel efficiency usually requires selection of the highest permissible ratio (i.e. lowest engine speed). Accordingly, the logic will rarely attempt a downshift of more than a single step. If the vehicle is rapidly decelerating due to high resistance operating condition, a single downshift may not be sufficient to maintain acceptable operating performance.

In the present invention, the logic is adapted to have a mode or modes ($D_1$, $D_L$) to improve or maximize performance. To maximize performance, the lowest permissible ratio (i.e. the highest engine speed) is required. Accordingly, even if the shift points are separated by less than N splits, the logic will "assume" rapid deceleration and will initiate a skip downshift if calculated expected engine speed after the skip downshift is not at a damaging value. The control will then upshift if necessary, or, preferably, again calculate expected engine speed after initiation of the skip downshift but prior to completing same and only actually engage the Nth lower gear if an immediate upshift is not required.

Although the present invention has been set forth with a certain degree of particularity, it is understood the various modifications are possible without departing from the spirit and scope of the invention as hereinafter claimed.

I claim:

1. An improved automatic transmission system for vehicles having a throttle-controlled engine, an operator actuated throttling control means and a transmission having a plurality of gear ratio combinations selectively engageable between a transmission input shaft and a transmission output shaft, said transmission input shaft being operatively connected to said engine, said transmission system including an information processing unit having means for receiving a plurality of input signals including (1) an input signal indicative of the position of said throttle controlling means, (2) an input signal indicative of the rotational speed of said engine, and (3) an input signal indicative of the speed of said vehicle, said processing unit including means for processing said input signals in accordance with a program to select a desirable gear ratio for a given combination of input signals and for generating output signals whereby said transmission system is operated in accordance with said program, and means associated with said transmission effective to actuate said transmission to effect engagement of one of said gear ratio combinations in response to said output signals from said processing unit, the improvement characterized by:

said processing unit including means for processing said input signals to provide a calculated expected engine speed value indicative of the expected rotational speed of the engine at a selected vehicle speed in various selectable gear ratio combinations;
said program having a first mode of operation wherein upon sensing an engine speed equal to or less than the engine speed at which downshifts to a lower gear ratio are required is effective to:
  (a) first compute a first expected engine speed value at the current vehicle speed and in the Nth lower gear ratio where N is an integer greater than 1;
  (b) then to command initiation of a downshift into a gear ratio intermediate the currently engaged gear ratio and the Nth lower than the currently engaged gear ratio if the first computed expected engine speed value is equal to or greater than the magnitude thereof at the maximum allowable speed of the engine and to command initiation of a downshift into the Nth lower gear ratio if the first computed expected engine speed value is less than the maximum allowable engine speed magnitude.

2. The improved system of claim 1, wherein said program is additionally effective to:
  (c) after initiation of a downshift to the Nth lower gear ratio and prior to engagement of the Nth lower gear ratio, compute a second expected engine speed value at the then current vehicle speed in the Nth lower gear ratio;
  (d) then to command engagement of a gear ratio intermediate the previously engaged ratio and the Nth lower than the previously engaged ratio if the second computed engine speed value equals or exceeds the engine speed value at which upshifts are commanded from the Nth lower ratio and to command engagement of the Nth lower gear ratio if the second calculated engine speed value is less than the engine speed value at which upshifts from the Nth lower ratio are commanded.

3. The improved system of claim 1 additionally comprising operator actuated mode of operation selection means and said input signals additionally including (4) an input signal indicative of operator selection of one of at least two selectable modes of forward vehicle operation, said program having a second mode of operation wherein said program is effective to command a downshift to only the next lower gear ratio upon sensing an engine speed equal to or less than the engine speed at which downshift to a lower ratio are indicated.

4. The improved system of claim 2 additionally comprising operator actuated mode of operation selection means and said input signals additionally including (4) an input signal indicative of operator selection of one of at least two selectable modes of forward vehicle operation, said program having a second mode of operation wherein said program is effective to command a downshift to only the next lower gear ratio upon sensing an engine speed equal to or less than the engine speed at which downshift to a lower ratio are indicated.

5. The improved system of claim 1, wherein the Nth lower ratio is the second lower gear ratio.

6. The improved system of claim 2, wherein the Nth lower ratio is the second lower gear ratio.

7. The improved system of claim 3, wherein the Nth lower ratio is the second lower gear ratio.

8. The improved system of claim 4, wherein the Nth lower ratio is the second lower gear ratio.

9. The improved system of claim 2, wherein said processing means includes means for increasing the engine speed at which an upshift will be commanded after a command to initiate a downshift.

10. The improved system of claim 4, wherein said processing means includes means for increasing the engine speed at which an upshift will be commanded after a command to initiate a downshift.

11. The improved system of claim 6, wherein said processing means includes means for increasing the engine speed at which an upshift will be commanded after a command to initiate a downshift.

12. The improved system of claim 8, wherein said processing means includes means for increasing the engine speed at which an upshift will be commanded after a command to initiate a downshift.

13. The improved system of claim 1, wherein said program will command downshifts only to the next lower gear ratio if the sensed throttle position is equal to a less than a reference throttle position.

14. The improved system of claim 2, wherein said program will command downshifts to only the next lower gear ratio if the sensed throttle position is equal to a less than a reference throttle position.

15. The improved system of claim 3, wherein said program will command downshifts to only the next lower gear ratio if the sensed throttle position is equal to a less than a reference throttle position.

16. The improved system of claim 4, wherein said program will command downshifts to only the next lower gear ratio if the sensed throttle position is equal to a less than a reference throttle position.

17. The improved system of claim 5, wherein said program will command downshifts to only the next lower gear ratio if the sensed throttle position is equal to a less than a reference throttle position.

18. The improved system of claim 6, wherein said program will command downshifts to only the next lower gear ratio if the sensed throttle position is equal to a less than a reference throttle position.

19. The improved system of claim 7, wherein said program will command downshifts to only the next lower gear ratio if the sensed throttle position is equal to a less than a reference throttle position.

20. The improved system of claim 8, wherein said program will command downshifts to only the next lower gear ratio if the sensed throttle position is equal to a less than a reference throttle position.

21. The improved system of claim 10, wherein said program will command downshifts to only the next lower gear ratio if the sensed throttle position is equal to a less than a reference throttle position.

22. The improved system of claim 12, wherein said program will command downshifts to only the next lower gear ratio if the sensed throttle position is equal to a less than a reference throttle position.

23. The improved system of claim 13, wherein said reference throttle position is equal to or greater than 60% of full throttle.

24. The improved system of claim 14, wherein said reference throttle position is equal to or greater than 60% of full throttle.

25. The improved system of claim 15, wherein said reference throttle position is equal to or greater than 60% of full throttle.

26. The improved system of claim 16, wherein said reference throttle position is equal to or greater than 60% of full throttle.

27. The improved system of claim 18, wherein said reference throttle position is equal to or greater than 60% of full throttle.

28. The improved system of claim 21, wherein said reference throttle position is equal to or greater than 60% of full throttle.

29. The improved system of claim 22, wherein said reference throttle position is equal to or greater than 60% of full throttle.

30. The improved system of claim 1 additionally comprising an input signal (5) indicative of the operator applying the vehicle brakes and wherein said program will command downshifts only to the next lower gear ratio if the operators application of the vehicle brakes is sensed.

31. The improved system of claim 2 additionally comprising an input signal (5) indicative of the operator applying the vehicle brakes and wherein said program will command downshifts only to the next lower gear ratio if the operators application of the vehicle brakes is sensed.

32. The improved system of claim 3 additionally comprising an input signal (5) indicative of the operator applying the vehicle brakes and wherein said program will command downshifts only to the next lower gear ratio if the operators application of the vehicle brakes is sensed.

33. The improved system of claim 4 additionally comprising an input signal (5) indicative of the operator applying the vehicle brakes and wherein said program will command downshifts only to the next lower gear ratio if the operators application of the vehicle brakes is sensed.

34. The improved system of claim 13 additionally comprising an input signal (5) indicative of the operator applying the vehicle brakes and wherein said program will command downshifts only to the next lower gear ratio if the operators application of the vehicle brakes is sensed.

35. The improved system of claim 14 additionally comprising an input signal (5) indicative of the operator applying the vehicle brakes and wherein said program will command downshifts only to the next lower gear ratio if the operators application of the vehicle brakes is sensed.

36. The improved system of claim 16 additionally comprising an input signal (5) indicative of the operator applying the vehicle brakes and wherein said program will command downshifts only to the next lower gear ratio if the operators application of the vehicle brakes is sensed.

37. The improved system of claim 4, wherein the engine speeds at which upshifts are commanded in said second mode is less than the engine speed at which upshifts are commanded in said first mode.

38. The improved system of claim 8, wherein the engine speeds at which upshifts are commanded in said second mode is less than the engine speed at which upshifts are commanded in said first mode.

39. The improved system of claim 10, wherein the engine speeds at which upshifts are commanded in said second mode is less than the engine speed at which upshifts are commanded in said first mode.

40. The improved system of claim 16, wherein the engine speeds at which upshifts are commanded in said second mode is less than the engine speed at which upshifts are commanded in said first mode.

41. The improved system of claim 33, wherein the engine speeds at which upshifts are commanded in said second mode is less than the engine speed at which upshifts are commanded in said first mode.

42. The improved system of claim 36, wherein the engine speeds at which upshifts are commanded in said second mode is less than the engine speed at which upshifts are commanded in said first mode.

43. The improved system of claim 1, wherein said input signal indicative of the speed in said vehicle is a signal indicative of the rotational speed of said output shaft.

44. The improved system of claim 2, wherein said input signal indicative of the speed in said vehicle is a signal indicative of the rotational speed of said output shaft.

45. The improved system of claim 3, wherein said input signal indicative of the speed in said vehicle is a signal indicative of the rotational speed of said output shaft.

46. The improved system of claim 4, wherein said input signal indicative of the speed in said vehicle is a signal indicative of the rotational speed of said output shaft.

47. The improved system of claim 9, wherein said input signal indicative of the speed in said vehicle is a signal indicative of the rotational speed of said output shaft.

48. The improved system of claim 10, wherein said input signal indicative of the speed in said vehicle is a signal indicative of the rotational speed of said output shaft.

49. The improved system of claim 14, wherein said input signal indicative of the speed in said vehicle is a signal indicative of the rotational speed of said output shaft.

50. The improved system of claim 16, wherein said input signal indicative of the speed in said vehicle is a signal indicative of the rotational speed of said output shaft.

51. An improved automatic transmission system for vehicles having a throttle-controlled engine, an operator actuated throttling control means and a transmission having a plurality of gear ratio combinations selectively engageable between a transmission input shaft and a transmission output shaft, said transmission input shaft being operatively connected to said engine, said transmission system including an information processing unit having means for receiving a plurality of input signals including (1) an input signal indicative of the position of said throttle controlling means, (2) an input signal indicative of the rotational speed of said engine, and (3) an input signal indicative of the speed of said vehicle, said processing unit including means for processing said input signals in accordance with a program to select a desirable gear ratio for a given combination of input signals and for generating output signals whereby said transmission system is operated in accordance with said program, and means associated with said transmission effective to actuate said transmission to effect engagement of one of said gear ratio combinations in response to said output signals from said processing unit, the improvement characterized by:

said system including selector means whereby the operator may select a first mode of operation wherein downshifts from the currently engaged gear ratio to the Nth lower gear ratio, where N is an integral greater than one, are initiated if the expected engine speed at current vehicle speed does not exceed a predetermined maximum value and a second mode of operation wherein downshifting is limited to engagement of the next lower gear ratio from the current engaged gear ratio only.

* * * * *

UNITED STATES PATENT AND TRADEMARK OFFICE
CERTIFICATE OF CORRECTION

PATENT NO. : 4,576,065

DATED : March 18, 1986

INVENTOR(S) : Speranza et al

It is certified that error appears in the above—identified patent and that said Letters Patent is hereby corrected as shown below:

Column 1, above line 5, the following should be inserted:

GOVERNMENT RIGHTS STATEMENT

The U.S. Government has rights in this invention pursuant to Contract No. DAAE07-82-C-4121 awarded by the U.S. Department of Defense.

Signed and Sealed this

Nineteenth Day of April, 1988

Attest:

DONALD J. QUIGG

*Attesting Officer*  *Commissioner of Patents and Trademarks*